(No Model.) 2 Sheets—Sheet 1.

E. JARRELL.
VEHICLE SPRING.

No. 390,372. Patented Oct. 2, 1888.

WITNESSES:
Fred G. Dieterich
P. B. Turpin

INVENTOR
E. Jarrell
BY Munn & Co
ATTORNEY (No Model.)  E. JARRELL.  2 Sheets—Sheet 2.
VEHICLE SPRING.
No. 390,372.  Patented Oct. 2, 1888.
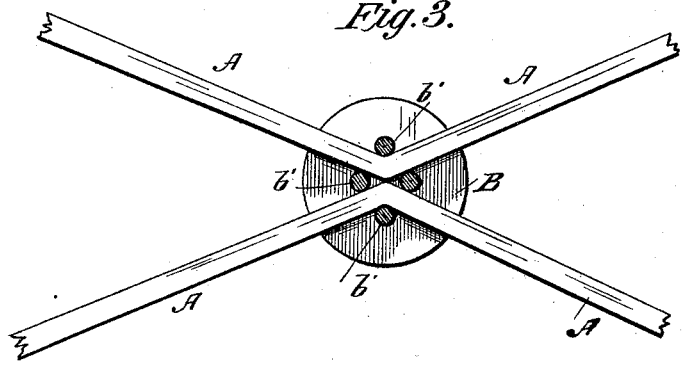
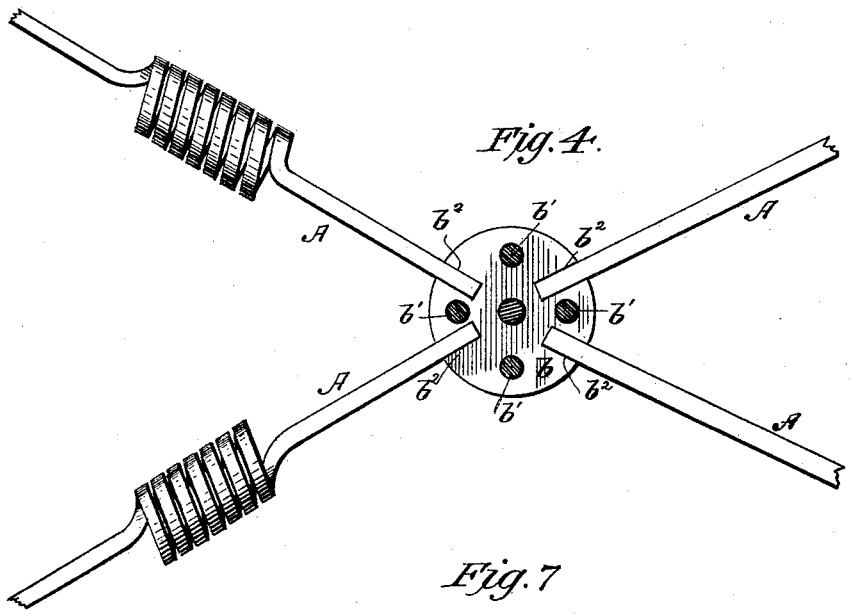
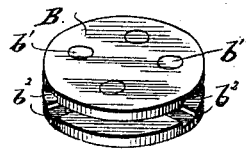
WITNESSES:
Fred G. Dieterich
P. B. Turpin
INVENTOR
E. Jarrell
BY Munn & Co
ATTORNEY

UNITED STATES PATENT OFFICE.

EDWIN JARRELL, OF HARPER, KANSAS.

VEHICLE-SPRING.

SPECIFICATION forming part of Letters Patent No. 390,372, dated October 2, 1888.

Application filed June 4, 1888. Serial No. 275,982. (No model.)

*To all whom it may concern:*

Be it known that I, EDWIN JARRELL, of Harper, in the county of Harper and State of Kansas, have invented a new and useful Improvement in Vehicle-Springs, of which the following is a specification.

My invention is an improvement in torsion-springs for vehicles; and the invention consists in certain novel constructions and combinations of parts whereby I am able to avail myself in a simple manner of the square torsion of the spring-bars, and in certain other improvements, as will be hereinafter more fully described and specified.

Figure 1:
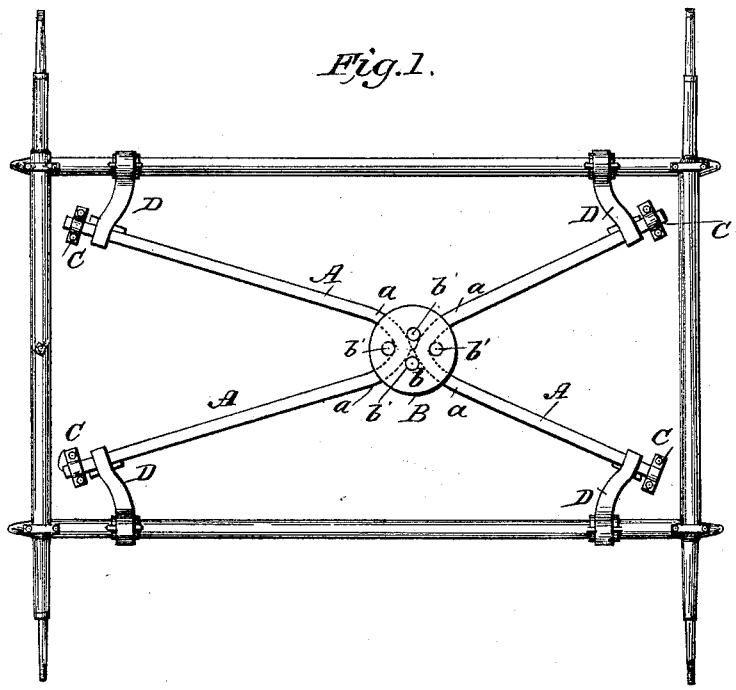
Figure 5:
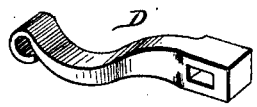
Figure 2:
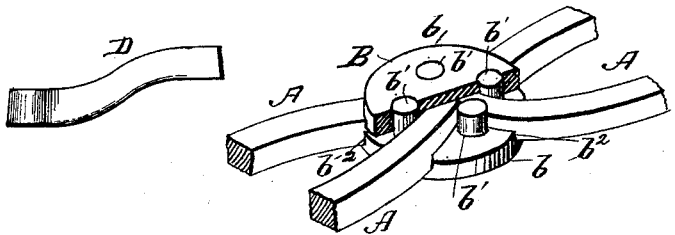
Figure 6:
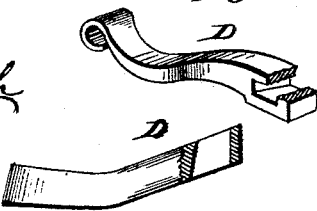

In the drawings, Figure 1 shows my invention in connection with the body and part of the running-gear of a vehicle. Fig. 2 is a detail view of the center connection, with portions of the spring-bars. Figs. 3 and 4 show somewhat different constructions of the spring-bars; and Figs. 5, 6, and 7 are detail views, all of which will be described.

In carrying out my invention I provide the spring-bars A, connected centrally, diverging from said central connection, journaled at their outer ends to the vehicle-body, and arms connected at one end with said spring-bars near the outer ends thereof and having their other ends connected with the running-gear. The center connection, B, is preferably constructed, as shown in Figs. 1, 2, and 7, of plates $b$ and rivets or bolts $b'$, by which to secure the plates $b$ together and the spring-bars firmly between them, the said plates $b$ being also preferably grooved on their inner faces at $b^2$, forming seats for the spring-bars, in order to more rigidly secure such bars, as will be readily understood. It will also be understood that, if desired, the central connection, B, might be bolted or otherwise suitably secured to the vehicle-body.

In journaling the outer ends of the spring-bars to the body, boxes C, having bearings fitted to receive the journal ends of the bars A, are preferably secured to the under side of the body, as shown.

The spring-bars A may be made separately, as shown in Fig. 1, or they may be formed in pairs bent from two rods, as shown in Fig. 3, or they may be made as shown in Fig. 4, in which latter figure the two front bars are partially coiled.

In the construction shown in Fig. 1 the bars A are curved at $a$, near their juncture with the connection B, which curved portions arrest jars and shocks when on rough roads and receive the thrust of end surges of the vehicle-body. These curves $a$ also tend to compensate for the lengthening and shortening of the spring-bars as they are torsionally twisted, and so avoid the disagreeable noise in the journals incident to end motion therein. The curving of the spring-bars also permits the use of longer bars than when the said parts are made straight. The lateral arms D connect at one end with the spring-bars, and are suitably connected at their outer ends to the running-gear frame, usually by shackling them to the side bars, as shown in Fig. 1.

It will be noticed that the arms D are so formed and connected with the spring-bars that they practically incline toward the center of the side bars. This is especially desirable in the front arms, D, in order that the front axle may not come in contact with the outer ends of said arms in turning. This arrangement of the arms D may be secured by bending said arms, as shown in Figs. 1 and 5, or by forming the opening $d$ for the spring-bar at an incline, as will be understood from Fig. 6 of the drawings.

It will be seen that by connecting the inner ends of the arms and journaling the outer ends thereof to the body and securing the crank-arms to said ends I secure a square torsional action of the spring. In this connection it will be seen the bars are held from any swinging motion, but are free to be turned to bring the torsion into play.

By using the coiled bars for the front spring-bars such bars may be made short and more compact, permitting the rear bars to be made longer, and enabling the connection to be shifted forward. These coiled bars also may be spread apart at their forward ends to any desired extent for the purpose of causing the crank-arms to extend in farther toward the center of the side bars.

Having thus described my invention, what I claim as new is—

1. A vehicle-spring consisting of spring-bars converging centrally and connected at such points and having their outer ends journaled to the body, and crank-arms connected with said spring-bars and adapted to connect same with the running-gear frame, substantially as set forth.

2. The combination of the vehicle-body and running-gear, the spring-bars journaled at their outer ends to the body, a connection uniting the inner ends of said bars, and the arms secured at one end to said spring-bars and connected at their opposite ends to the running-gear frame, substantially as set forth.

3. The vehicle-body, the side bars, and the spring-bars diverging outwardly, combined with the arms connected at one end with the spring-bars and inclining toward the middle of the side bars, substantially as set forth.

4. The spring-bars converging centrally, combined with the plates lapped above and below said spring-bars, each of said plates having its inner face or side grooved to receive the spring-bars, and fastenings whereby to secure such plates, substantially as set forth.

5. The combination of the vehicle-body, the running-gear frame, the spring-bars converging centrally and journaled at or near their outer ends to the vehicle-body, and arms for connecting the outer ends of the spring-bars with the running-gear frame, substantially as set forth.

6. The improvement herein described, consisting of the vehicle-body, the running-gear, the spring-bars journaled at their outer ends to the body and converging centrally, the connection uniting said bars and consisting of upper and lower plates and fastenings, and the crank-arms, substantially as set forth.

EDWIN JARRELL.

Witnesses:
I. W. M. MUNN,
C. W. PALMER.